United States Patent

[11] 3,588,879

[72] Inventor Barry Litofsky
Matawan, N.J.
[21] Appl. No. 718,135
[22] Filed Apr. 2, 1968
[45] Patented June 28, 1971
[73] Assignee Bell Telephone Laboratories, Incorporated
Murray Hill, N.J.

[54] MULTIDIGIT CODE TRANSLATOR
5 Claims, 32 Drawing Figs.

[52] U.S. Cl. ........ 340/347, 179/18
[51] Int. Cl. ........ G06f 5/02
[50] Field of Search ........ 179/18 (TR); 340/347, 166; 307/88 (ICIREPAT)

[56] References Cited
UNITED STATES PATENTS

| | | | |
|---|---|---|---|
| 2,905,934 | 9/1959 | Flint | 340/347 |
| 3,333,261 | 7/1967 | Basset | 340/347 |
| 2,907,019 | 9/1959 | Merlin Jr. | 340/347 |
| 3,268,875 | 8/1966 | Schaffer | 340/347 |

*Primary Examiner*—Maynard R. Wilbur
*Assistant Examiner*—Charles D. Miller
*Attorneys*—R. J. Guenther and Kenneth B. Hamlin

ABSTRACT: A code translator is developed for concurrently translating multidigit decimal numbers in the two-out-of-five code to three tones-out-of-39 tones for simultaneous modulation of a carrier signal. The translator includes four relay converters for converting input code words to intermediate code words that drive cells of switching trees. Auxiliary control circuits are arranged to enable three switching trees to control output tone relays and to complement the state of selected cells of the switching trees.

PATENTED JUN 28 1971 3,588,879

INVENTOR
B. LITOFSKY
BY Kenneth B. Hamlin
ATTORNEY

| | INPUT | | | | | | | | OUTPUT | |
|---|---|---|---|---|---|---|---|---|---|---|
| | X | | | | Y | | | | | |
| | $B_X$ | $C_X$ | $D_X$ | $B_T$ | $B_Y$ | $C_Y$ | $D_Y$ | $C_T$ | $E_{XY}$ | $G_{XY}$ |
| X = Y | 0 | 0 | 0 | 0 | 0 | 0 | 0 | 0 | 1 | 0 |
| X < Y | 0 | 0 | 0 | 0 | 0 | 0 | 0 | 1 | 0 | 0 |
| X > Y | 0 | 0 | 0 | 1 | 0 | 0 | 0 | 0 | 0 | 1 |

| | INPUT | | | | | | | | OUTPUT | |
|---|---|---|---|---|---|---|---|---|---|---|
| | Y | | | | Z | | | | | |
| | $B_Y$ | $C_Y$ | $D_Y$ | $C_T$ | $B_Z$ | $C_Z$ | $D_Z$ | $D_T$ | $E_{YZ}$ | $G_{YZ}$ |
| Y = Z | 0 | 0 | 0 | 1 | 0 | 0 | 0 | 1 | 1 | 0 |
| Y < Z | 0 | 0 | 1 | 0 | 0 | 1 | 0 | 1 | 0 | 0 |
| Y > Z | 1 | 0 | 0 | 1 | 0 | 0 | 1 | 0 | 0 | 1 |

| | INPUT | | | | | | | | OUTPUT | |
|---|---|---|---|---|---|---|---|---|---|---|
| | X | | | | Z | | | | | |
| | $B_X$ | $C_X$ | $D_X$ | $B_T$ | $B_Z$ | $C_Z$ | $D_Z$ | $D_T$ | $E_{XZ}$ | $G_{XZ}$ |
| X = Z | 0 | 1 | 0 | 1 | 0 | 1 | 0 | 1 | 1 | 0 |
| X < Z | 0 | 1 | 0 | 0 | 1 | 0 | 0 | 0 | 0 | 0 |
| X > Z | 1 | 0 | 0 | 1 | 1 | 0 | 0 | 0 | 0 | 1 |

FIG. 8

| INPUTS | | | | | | | | | | | | OUTPUTS | | | | | | | | | | | | | | | | | | | | | | | | | | COMPLEMENT TO | | |
|---|---|---|---|---|---|---|---|---|---|---|---|---|---|---|---|---|---|---|---|---|---|---|---|---|---|---|---|---|---|---|---|---|---|---|---|---|---|---|---|---|
| $A_T$ | $A_{X1}$ | $A_{Y1}$ | $A_{Z1}$ | $E_{XY}$ | $G_{XY}$ | $E_{YZ}$ | $G_{YZ}$ | $E_{XZ}$ | $G_{XZ}$ | $B_X$ | $C_X$ | X | Y | Z | 34 | 35 | 36 | 37 | 38 | 32+ $B_T$ | 32+ $C_T$ | 32+ $D_T$ | 32+ $D_X B_T$ | 32+ $D_Y C_T$ | 32+ $D_Z C_T$ | 33+ $D_X$ | 34+ $C_X$ | 36+ $C_X$ | 36+ $D_X$ | 36+ $D_Y$ | 36+ $B_Y C_Y$ | $A_X$ | $A_Y$ | $A_Z$ |
| 0 | 0 | 0 | 0 | 0 | 1 | — | — | — | — | — | — | 1 | 1 | 1 | 0 | 0 | 0 | 0 | 0 | 0 | 0 | 0 | 0 | 0 | 0 | 0 | 0 | 0 | 0 | 0 | 0 | * | * | 1 |
| 0 | 0 | 0 | 0 | 0 | 0 | — | — | — | — | — | — | 1 | 1 | 1 | 0 | 0 | 0 | 0 | 0 | 0 | 0 | 0 | 0 | 0 | 0 | 0 | 0 | 0 | 0 | 0 | 0 | 1 | 1 | * |
| 0 | 0 | 0 | 0 | 1 | 0 | 0 | 1 | — | — | — | — | 0 | 1 | 1 | 0 | 1 | 0 | 0 | 0 | 0 | 0 | 0 | 0 | 0 | 0 | 0 | 0 | 0 | 0 | 0 | 0 | * | * | * |
| 0 | 0 | 0 | 0 | 1 | 0 | 0 | 0 | — | — | — | — | 0 | 1 | 1 | 0 | 1 | 0 | 0 | 0 | 0 | 0 | 0 | 0 | 0 | 0 | 0 | 0 | 0 | 0 | 0 | 0 | * | 1 | 1 |
| 0 | 0 | 0 | 0 | 1 | 0 | 1 | 0 | — | — | 1 | — | 0 | 0 | 0 | 0 | 0 | 1 | 1 | 0 | 0 | 0 | 0 | 0 | 0 | 1 | 0 | 0 | 0 | 0 | 0 | 0 | * | * | * |
| 0 | 0 | 0 | 0 | 1 | 0 | 1 | 0 | — | — | 0 | — | 0 | 0 | 0 | 0 | 0 | 0 | 0 | 0 | 1 | 0 | 0 | 0 | 0 | 0 | 1 | 1 | 0 | 0 | 0 | 0 | * | * | * |

MULTIDIGIT CODE TRANSLATOR

BACKGROUND OF THE INVENTION

1. Field of the Invention

The invention is a code translator that is more particularly described as a translator for converting a number in one coded representation into another coded representation.

2. Description of the Prior Art

Modern industry makes wide use of signaling systems, which include a plurality of receiver stations and a transmitter that can selectively call an individual one of the plurality of receiver stations. The transmitters of these signaling systems have an associated translator for changing a number in one code representation into another code representation. One such translator changes numbers coded in electrical signal data bits into a group of three audible tones having different frequencies. The three tones are used simultaneously to modulate radio signals emanating from the transmitter. Each individual receiving station includes an alarm which is activated in response to its receipt of a predetermined distinct group of the three tones demodulated from the transmitted radio signals.

The translator of one of such systems receives signals representing four decimal digits assigned to a particular receiving station and encodes those digits into three-out-of-32 tones. The three tones are all transmitted simultaneously so that the order of the three tones becomes meaningless. Since the order of the three tones is meaningless, many possible permutations of the 32 tones are therefore redundant and useless. Because of the redundancies, this translator requires a decimal number block of approximately 10,000 consecutive numbers to produce 3,200 unique combinations of the three-out-of-32 tones.

In locations where more than 3,200 receiving stations are required, the prior art system should be enlarged to accommodate more customers. Straightforward expansion of the prior art translator to accommodate more than 3,200 combinations is possible, but such expansion is uneconomical because a prohibitively large number of switching devices is needed to adequately expand the translator.

SUMMARY OF THE INVENTION

It is therefore an object of the invention to translate a large group of numbers coded in data bits into groups of tones representing the numbers.

It is another object to increase the usable numbers of a consecutive number group for identifying individual receiving stations in a selective signaling system.

It is a further object to reduce the investment required to translate a large group of coded decimal numerals into unique groups of tones.

These and other objects of the invention are realized in an illustrative embodiment thereof in which a translator is arranged to receive concurrently a plurality of input code words and to translate simultaneously the input code words into groups of signals representing various combinations of N different signals taken three at a time, wherein N is greater than three. In this illustrative embodiment, the plurality of input code words are converted concurrently into a plurality of intermediate code words which control selection of three-out-of-N output signals. A comparator compares the relative magnitudes of the intermediate code words and produces control signals which selectively change the intermediate code words and thereby substitute a different output signal for one or more of the three output signals.

A feature of the invention is a combination of circuits translating a plurality of input code words into all possible combinations of N different signals taken M at a time, where N is greater than M and M is greater than two.

It is another feature of the invention to receive and concurrently convert the plurality of input code words to a plurality of intermediate code words which select M different output signals.

Another feature of the invention is a translation of data from a two-out-of-five code to a three-out-of-39 code by the steps of:

a. applying input signals to converters, b. concurrently converting K input code words to K binary-coded decimal code words and to M intermediate code words, c. energizing cells of separate switching trees to a state representing the intermediate code words, d. energizing auxiliary control circuits to a state representing a comparison of the intermediate code words, e. simultaneously enabling M switching trees to control output signals and complementing the state of selected cells of the switching trees in response to the state of the auxiliary circuits, and f. initiating M different output signals.

Another feature is the use of code conversion relays as drive relays for cells of M major switching trees such that at least one code conversion relay of the translator produces auxiliary control functions for selectively complementing certain drive relays of the M major switching trees.

Another feature is the use of a state set into auxiliary relays and a comparison of the binary value of intermediate code words to detect ambiguously translatable number combinations and to complement certain switching tree cells for substituting an unambiguous output for one of the ambiguous outputs.

A further feature is the provision of auxiliary control circuits for complementing selected cells of the major and minor relay switching trees in response to predetermined combinations of intermediate code words.

A further feature is the selective enabling of a total of M major and minor switching trees in response to every input code combination.

A still further feature is the arrangement of K code converters in combination with M switching trees to perform a translation from K decimal digits in the two-out-of-five code to an indication of M-out-of-N simultaneously generated tones.

BRIEF DESCRIPTION OF THE DRAWINGS

A better understanding of the invention may be derived from the detailed description following if that description is considered with respect to the attached drawings in which:

FIG. 8 is a portion of a truth table for determining the structure of logic control circuits associated with the switching trees of the translator;

DETAILED DESCRIPTION

Figure 1:
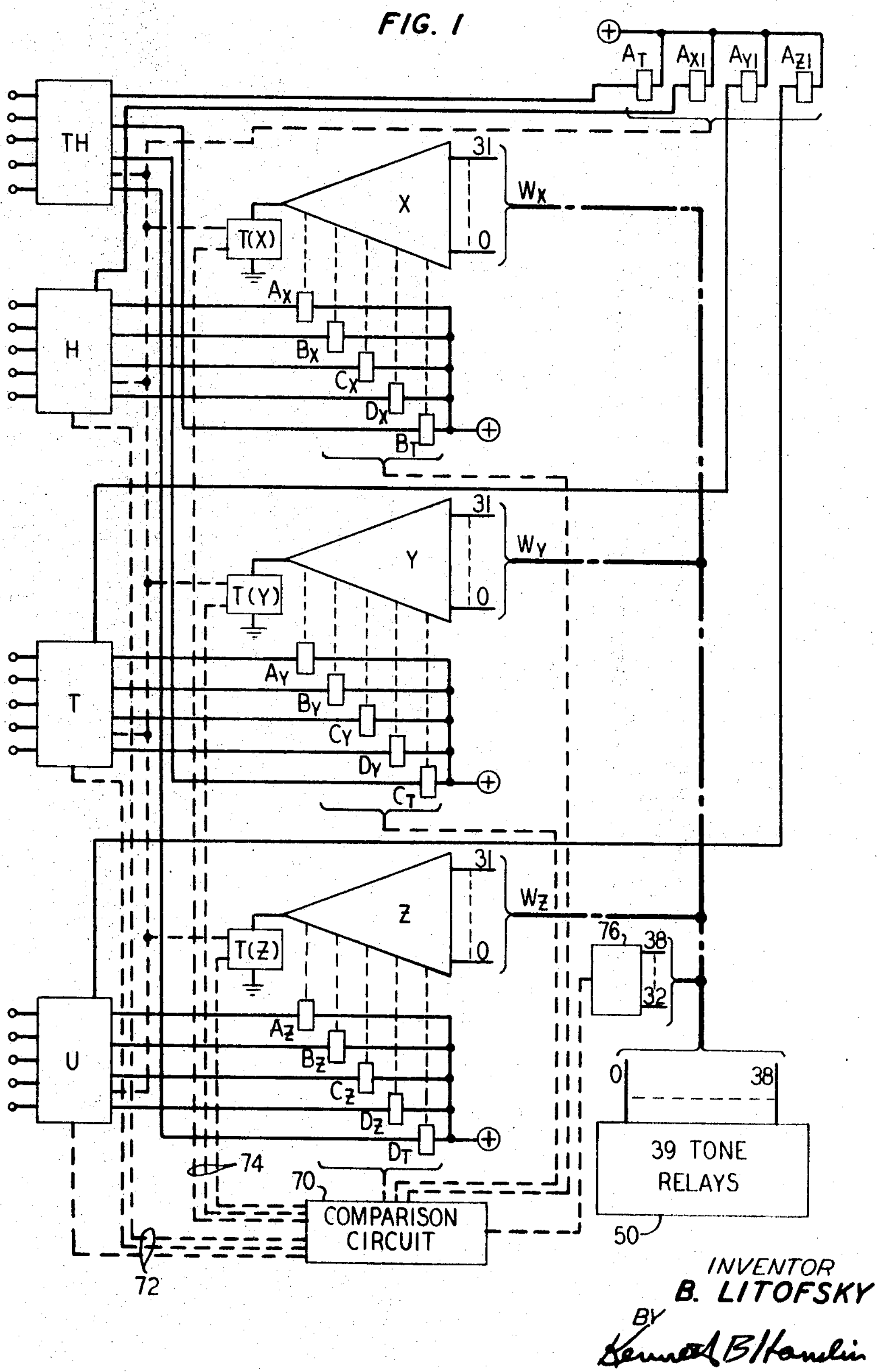
FIG. 1 is a block diagram of a translator in accordance with the invention.

Referring now to FIG. 1, there is shown an illustrative embodiment of a translator which receives simultaneously over parallel input paths a group of coded input signals representing decimal digits and which produces a corresponding set of output signals in an M-out-of-N code. The translator is adapted for use with a transmitter for selectively calling an individual subscriber's receiving station from among a plurality of such stations.

As a first step in translation, input signals are received and applied simultaneously through K sets of five separate but associated input terminals of the translator. In the illustrative embodiment, K is equal to four. The input signals are arranged in four input code words, each of which represents one of four decimal digits in a two-out-of-five code. These digits are the thousands TH, hundreds H, tens T, and units U digits of the individual subscriber's assigned station number. The decimal digits or input code words may be represented as:

Thousands TH 0, 1, 2, 4, 7
Hundreds H 0, 1, 2, 4, 7
Tens T 0, 1, 2, 4, 7
Units U 0, 1, 2, 4, 7 to indicate the five 0" elements for each decimal digit represented by the separate input code words. In accordance with the two-out-of-five code for any decimal digit, two and only two of the five elements in the pertinent input code word are equal to "1" at any time. The remaining three elements of the input code word equal "0" at that same time.

Each set of five input terminals is associated with a separate one of K two-out-of-five to binary converters. Each of such converters is used for converting one of the four input code words into its equivalent binary number. The four binary words form a binary-coded-decimal representation of the pertinent decimal digits as a part of a second step in the code translation. These converters are designated TH, H, T, and U respectively, to correspond with the decimal digit for which they make the aforementioned code conversion. Thus the converter U converts the input code word representation of the units digit of the decimal number into its corresponding binary word representation. Similarly the converters T, H, and TH, respectively, convert the input code word representations of the tens, hundreds, and thousands digits of the subscriber's assigned decimal station number into their corresponding binary word representations.

Figure 2:
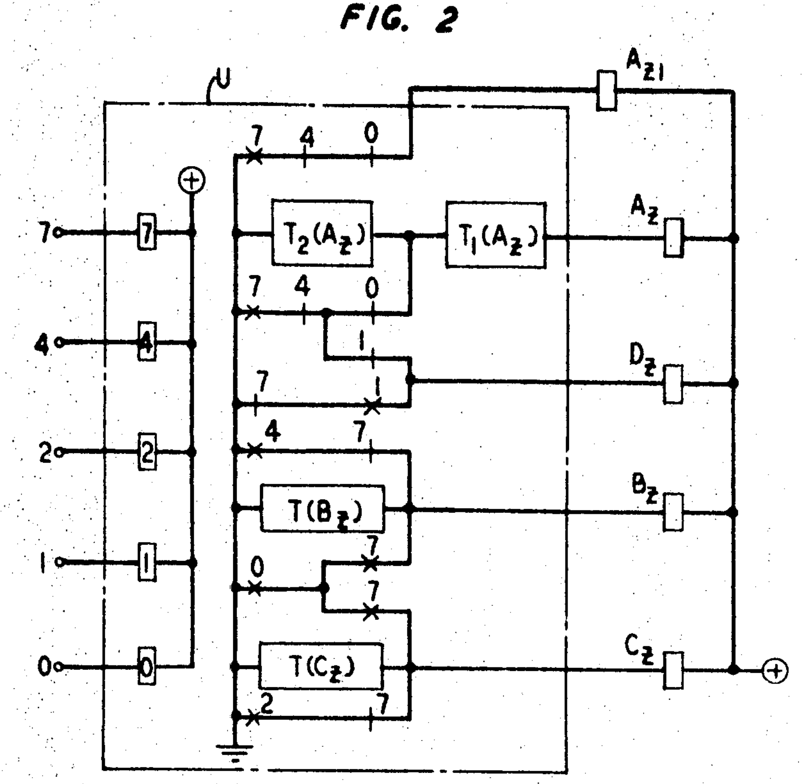
FIG. 2 is a schematic diagram of a converter included within the translator of the invention.

Each of the converters TH, H, T, and U is a relay converter, such as the converter U shown in FIG. 2. In FIG. 2 there is shown a set of five input terminals 0, 1, 2, 4, and 7. Input signals, representing the five-element code word of the units digit of the subscriber's station number, are applied simultaneously in their weighed order to the respective input terminals 0, 1, 2, 4, and 7.

The power supplies for the converter U, as well as power supplies for various circuits of the illustrative embodiment, are shown as a circle enclosing a plus sign. Each circle and sign indicates that a power supply terminal of positive potential is connected where shown, and a negative potential terminal of the same supply is connected to ground.

The converter U is arranged to convert the five-element input code word of the units decimal digit into a corresponding four-element binary word as a first part of the second step of translation. This conversion is accomplished in a manner known in the prior art except that the converter is arranged for complementing selected relays of the converter after they are initially set. The complement operation occurs in response to certain predetermined combinations of input signals which are converted to binary words and are then used to operate control circuits. These control circuits determine the converter relays that are to be complemented and initiate the required complement operations in a manner described in greater detail hereinafter.

In the converter U, there are five converter drive relays 0, 1, arranged to operate in response to an input signal "1," or closed path to ground potential, and to remain unoperated in response to an input signal "0," or open path to ground. Therefore when an input code word is initially applied to the converter U, two converter drive relays operate and three converter drive relays remain unoperated. Since four code words are applied simultaneously and separately to the converters TH, H, T, and U shown in FIG. 1, two converter drive relays in each converter are energized and operate concurrently to complete the first part of the second step in the process of translating the subscriber's station number.

In the FIG. 2, the converter U includes a switch contact logic circuit which converts each input code word to a binary word used for operating switching tree drive relays A , $B_Z$, $C_Z$, and $D_Z$ and an auxiliary relay $A_{Z1}$ as soon as the converter drive relays have been set in the second step of the translation. The logic circuits is shown in detached contact form, wherein pairs of contacts are drawn in the schematic in a concise manner and are identified by labels which correspond to the labels of the controlling converter drive relays. In the detached contact representation, the pairs of contacts are superimposed on leads as either an ✕ or a +, respectively, representing normally open and normally closed contacts. Such detached contact representation is used in other figures of this specification. After the signals for energizing the relays $A_Z$, $B_Z$, $C_Z$, and $D_Z$ have been established in response to the logic circuit, those signals represent a four-element binary word corresponding to the units digit of the subscriber's station number. The state of the signal for energizing the additional relay $A_{Z1}$ is controlled so that it operates in response to the same input codes which initially operate the relay $A_Z$.

For example when the units digit of the subscriber's station number is seven, the two-out-of-five input code word U–0, 1, 2, 4, 7 is equal to 10001 so that the converter drive relays 0 and 7 operate in the converter U. In the logic circuit of FIG. 2, the state of each pair of contacts designated either 0 or 7 is complemented thereby initiating signals to cause the relays $B_Z$, $C_Z$, and $D_Z$ to operate. No path closes to cause the relay $A_Z$ or the relay $A_{Z1}$ to operate. Therefore in response to the input code word representing the digit seven, the states of the relays $A_Z$, $B_Z$, $C_Z$, and $D_Z$ will become respectively 0111 corresponding to the binary representation of the decimal digit seven. That state of relay $A_{Z1}$ remains "0," but this state is used only for producing control functions, as described further hereinafter.

In a similar manner, it can be shown that each decimal digit applied to the input terminals of the converter U in the two-out-of-five code is converted to its corresponding binary word which is manifested by the state of the signals for energizing the switching tree drive relays $A_Z$, $B_Z$, $C_Z$, and $D_Z$.

The FIG. 2 also includes a series control circuit $T_1(A_Z)$ and some shunt control circuits $T_2(A_Z)$, $T(B_Z)$, and $T(C_Z)$ all of which are used advantageously to selectively complement the state initially set into their associated switching tree drive relays, in response to predetermined combinations of control circuit states that occur during translation. This complement operation together with the series and shunt control circuits are to be described in greater detail hereinafter.

As shown diagrammatically by dashed lines in FIG. 1, the switching tree drive relays associated with the converters U, T, H, and TH are arranged to electromechanically control the operation of switch contacts in the major switching trees X, Y, and Z during the code translation. Thus the switching tree drive relays $A_Z$, $B_Z$, $C_Z$, and $D_Z$, associated with the converter U, are the drive relays for individual cells of the switching tree Z. Similarly the relays $A_Y$, $B_Y$, $C_Y$, and $D_Y$, associated with the converter T, are the drive relays for cells of the switching tree Y, and the relays $A_X$, $B_X$, $C_X$, and $D_X$, associated with the converter H, are the drive relays for cells of the switching tree X. The switching tree drive relays $B_T$, $C_T$, and $D_T$, associated with the converter TH, are separated from one another so that each controls one cell in a separate one of the switching trees X, Y, $C_T$ controls a cell in the switching tree Y, and the relay $B_T$ controls a cell in the switching tree X. In addition, as shown diagrammatically by dashed lines, the relays $A_T$, $A_{X1}$, $A_{Y1}$, and $A_{Z1}$ are auxiliary relays that control contacts in enabling circuits, such as enabling circuits T(X), T(Y), and T(Z), which are used for enabling selected switching trees to control output tones. The relays $A_T$, $A_{X1}$, $A_{Y1}$, and $A_{Z1}$ also control series and shunt control circuits in the converters TH, H, T, and U for selectively complementing the state of switching tree drive relays, as further described hereinafter.

Figure 3:
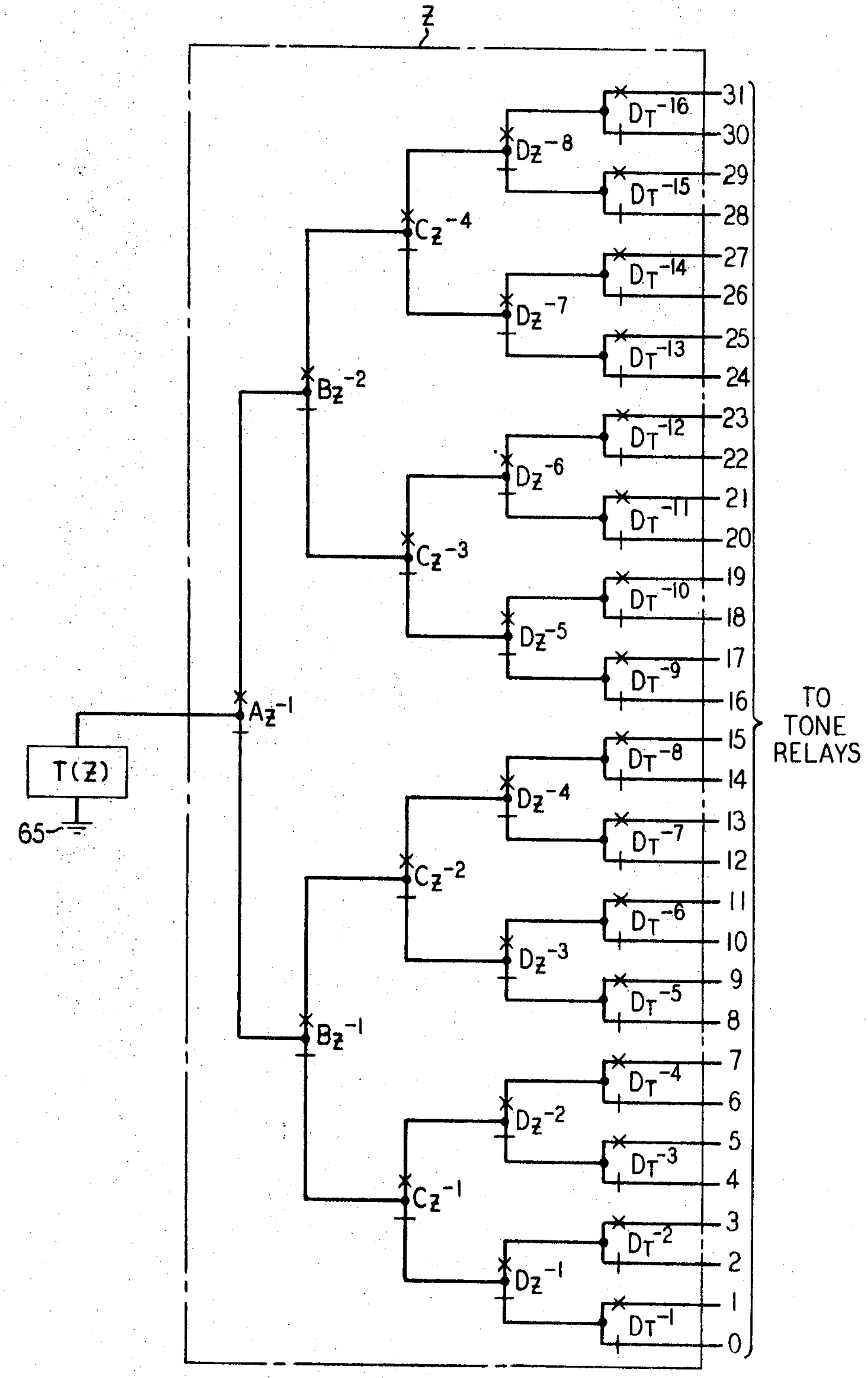
FIG. 3 is a schematic diagram of a major relay switching tree included in the translator.

For the illustrative embodiment of FIG. 1, each of the M major switching trees X, Y, and Z is a relay switching tree, such as the switching tree Z shown in FIG. 3. In FIG. 3 there is a five- or Q-cell switching tree Z comprising contacts from the switching tree drive relays $A_Z$, $B_Z$, $C_Z$, $D_Z$, and $D_T$. Each of the drive relays $A_Z$, $B_Z$, $C_Z$, $D_Z$ and $D_T$, shown in FIG. 1, controls the operation of switch contacts for one of the five cells. The states of these relays determine a unique path from ground 65 through the enabling circuit T(Z) and the switching tree Z to one of 32 output terminals 0 through 31. The enabling circuit T(Z) is interposed between ground and the input of the switching tree Z at the contacts of relay $A_Z$ so that the switching tree Z can be enabled to control operation of a tone relay only in response to predetermined combinations of input signals to the translator, as described hereinafter.

In FIG. 3 the switching tree Z is a logic circuit in detached contact form. The relay contacts of FIG. 3 can be distributed more nearly equally among the several relays, as is well known in the prior art, but the simpler form of FIG. 3 is used here for purposes of the illustrative embodiment.

The first and second steps in translation by the circuit of FIG. 1, convert the four input code words in the two-out-of-five code

TH 0, 1, 2, 4, 7
H 0, 1, 2, 4, 7
T 0, 1, 2, 4, 7
U 0, 1, 2, 4, 7 into three five-element intermediate code words

X $A_X, B_X, C_X, D_X, B_T$
Y $A_Y, B_Y, C_Y, D_Y, C_T$
Z $A_Z, B_Z, C_Z, D_Z, D_T$ for driving, or energizing, the drive relays of the three major switching trees X, Y, and Z and thereby completing the second step of the translation.

As an example of how these first two steps of the translation occur, assume that input signals, representing a customer station number 6437, are applied simultaneously to the input terminals of the converters TH, H, T, and U. The applied input code words are respectively

TH 00110
H 10010
T 01100
U 10001

The corresponding binary words are respectively

TH 0 1 1 0=$A_T, B_T, C_T, D_T$
H 0 1 0 0=$A_X, B_X, C_X, D_X$
T 0 0 1 1=$A_Y, B_Y, C_Y, D_Y$
U 0 1 1 1=$A_Z, B_Z, C_Z, D_Z$ which are arranged in the order of increasing significance from right to left. The resulting five-element intermediate code words which are used for driving the switching trees are respectively X 0 1 0 0 1=$A_X, B_X, C_X, D_X, B_T$
Y 0 0 1 1 1=$A_Y, B_Y, C_Y, D_Y, C_T$
Z 0 1 1 1 0=$A_Z, B_Z, C_Z, D_Z, D_T$ and $A_T$=0. The auxiliary relays $A_{X1}$, $A_{Y1}$, and $A_{Z1}$ also are all equal to 0 because they are initially energized respectively in accordance with the energization of the relays $A_X$, $A_Y$, and $A_Z$ simultaneously with the energization of the relays in the switching trees.

As soon as the intermediate code words are determined by operation of the contacts of the converters TH, H, T, and U, the switching tree drive relays are selectively energized through closed paths from ground through the converters and relay coils to associated power supplies as a third step of the translation.

At this point in the translation, either one of two conditions occurs. The first condition is that three unique output signals are determined and the enabling circuits T(X), T(Y), and T(Z) are enabled providing paths so that the relay switching trees X, Y, and Z, in response to the intermediate code words X, Y, and Z, simultaneously close paths to activate tone relays for turning on three different output tones. Each of the output terminals 0 through 31, shown in FIG. 3 is connected to the solenoid coil of one of $2^Q$, or 32, of the 39 tone relays 50, shown diagrammatically in FIG. 1. There is one output terminal of each major switching tree connected to each tone relay 0 through 31 so that each of these tone relays is subject to control by each of the three major switching trees, but only one of the switching trees controls each tone relay at a time because the closed paths lead to three different tone relays for the stated first condition. The second condition is that output signals are selected ambiguously and must be changed in response to the comparison circuit and the various enabling circuits, as described in detail hereinafter.

One manner in which output signals are ambiguously selected occurs in situations wherein one tone is selected concurrently by two or more switching trees. As an example, this manner of ambiguous selection occurs when the translation of a single input code word results in the switching trees X, Y, and Z respectively selecting the tones 6, 6, and 17. In this example only two, rather than the required three tones, are selected for transmission.

Another manner in which output signals are ambiguously selected occurs when two input code words select the same three tones in a different order. For instance a first code word may be translated so that the switching trees X, Y, and Z, respectively, select tones 6, 12, and 15, and a second code word may be translated so that the switching trees X, Y, and Z, respectively select tones 15, 6, and 12. Although the selected output signals may appear to be different because of the changed order of tones, these tones are to be transmitted concurrently, and the changed order is meaningless. Therefore the resulting output code signals are ambiguous.

In the aforementioned example of translating a customer station number 6437, the code words X, Y, and Z each cause a path to close through the respective relay switching trees X, Y, and Z for operating a different tone relay and thereby are ready to turn on three different tones, or signals. With reference to the switching tree X, similar to the switching tree Z shown in FIG. 3, the code word X causes a path to close for operating a tone relay associated with output terminal 9 by way of contacts $A_X$-1, $B_X$-1, $C_X$-2, $D_X$-3, and $B_T$-5. Similarly with reference to the switching tree Y, the code word Y causes a path to close for operating a tone relay associated with output terminal 7 by way of contacts $A_Y$-1, $B_Y$-1, $C_Y$-1, $D_Y$-2, $C_T$-4. Additionally with reference to the switching tree Z in FIG. 3, the code word Z causes a path to close for operating a tone relay associated with output terminal 14 of the switching tree Z by way of contacts $A_Z$-1, $B_Z$-1, $C_Z$-2, $D_Z$-4, $D_T$-8.

The foregoing example is descriptive of the first three steps of the translation scheme which produce many unique combinations of output signals, but the combinations still fall short of providing a desired number of distinct combinations of three-out-of-N tones because ambiguous combinations cannot be used. Therefore the translator is arranged to take additional steps in response to control circuits which increase the number of usable combinations of three-out-of-N tones. These additional steps include complementing the state of selected switching tree drive relays in response to the state of the auxiliary relays $A_T$, $A_{X1}$, $A_{Y1}$, and $A_{Z1}$ and to a comparison in circuit 70 of FIG. 1 of elements of the intermediate code words X, Y, and Z for shifting one or more initially selected tones either to different tone numbers, connected to the major switching trees, or to additional tones 32 through 38, connected to minor switching trees 76, shown in FIG. 1.

Figures 4, 5A, 5B, 5C:
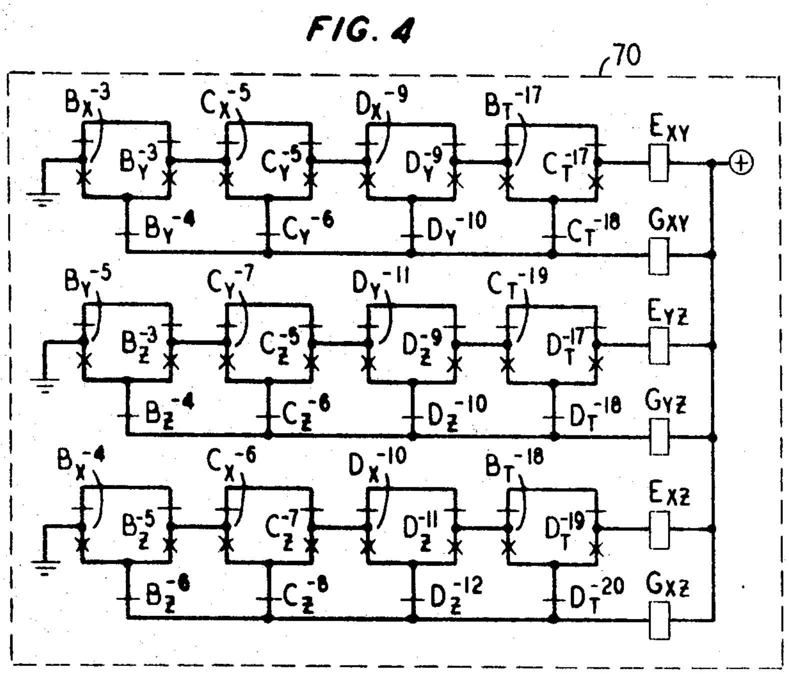
FIG. 4 is a schematic diagram of a comparison circuit used for developing control functions for complementing selected relays of the switching trees in the translator.
FIGS. 5A through 5C are truth tables showing samples of combinational logic used in the comparison circuit of FIG. 4.

Referring now to FIG. 4, there is shown a conventional comparison circuit 70 which includes detached contacts of the drive relays associated with the three major switching trees. In the comparison circuit 70, selected ones of relays $E_{XY}$, $G_{XY}$, $E_{YZ}$, $G_{YZ}$, $E_{XZ}$, and $G_{XZ}$ are enabled in response to the relative magnitudes of the rightmost four elements of the intermediate code words X, Y, and Z described previously. As shown diagrammatically by dashed lines in FIG. 1, contacts from the four rightmost cells of the major switching trees X, Y, and Z are included in the comparison circuit 70 to form the logic circuit shown in FIG. 4. These relays of the comparison circuit operate during a fourth step of the translation. Referring once again to FIG. 1, there is shown diagrammatically, by dashed lines 72, that the contacts of the relays $E_{XY}$, $G_{XY}$, $E_{YZ}$, $G_{YZ}$, $E_{XZ}$, and $G_{XZ}$ of the comparison circuit 70 are included in the converters U, T, and H and, by dashed lines 74, that additional contacts are included in the enabling circuits T(X), T(Y), and T(Z) for further controlling the operation of those converters and enabling circuits.

FIGS. 5A, 5B, and 5C are portions of truth tables which show the states of relays, such as the relays $E_{XY}$ and $G_{XY}$, in response to sample combinations of elements of intermediate code words. Thus as shown in the top row in FIG. 5A, when the binary number value of the pertinent elements of the code word X is equal to the value of the pertinent elements of the code word Y, the relay $E_{XY}$ is operated. When the binary value of the elements of the code word X is greater than the binary value of the pertinent elements of the code word Y as shown in the bottom row of FIG. 5A, the relay $G_{XY}$ is operated. Similarly when the code word X is less than the code word Y as shown in the center row of FIG. 5A, neither relay $E_{XY}$ nor relay $G_{XY}$ is operated. Additional binary combinations of X and Y words having one of the three magnitude combinations shown in the left-hand column can be entered into the table of FIG. 5A, but the states of the relays $E_{XY}$ and $G_{XY}$ are activated only as stated in response to the relative magnitudes of the code words X and Y. Therefore the truth table of FIG. 5A is left open at the bottom so that additional binary combinations of the X and Y words can be entered. FIG. 5B is similar to FIG. 5A but pertains to the operation of the relays $E_{YZ}$ and $G_{YZ}$ in response to the relative magnitudes of the pertinent elements of the code words Y and Z. FIG. 5C is also similar but pertains particularly to the operation of the relays $E_{XZ}$ and $G_{XZ}$ in response to the relative magnitudes of the pertinent elements of the code words X and Z.

As a fifth step in the translation operation, the series and shunt control circuits, such as circuits $T_1(A_Z)$, $T_2(A_Z)$, $T(B_Z)$, and $T(C_Z)$ of FIG. 2, complement the state initially established in selected drive relays of the various switching trees. These switching tree drive relays are to be complemented in accordance with the operation of series and shunt control circuits interposed in the converters U, T, H, and TH, as hereinafter described. For the present it should be mentioned that in the foregoing example translation of the customer number 6437, the relay $A_Z$ will be complemented from its initially unoperated state to its operated state in response to the shunt control circuit $T_2(A_Z)$, shown in FIG. 2. The relay $A_Z$ is complemented because the tones selected by the translation are ambiguous with respect to the tones selected by translating a different input code.

Figure 6A:
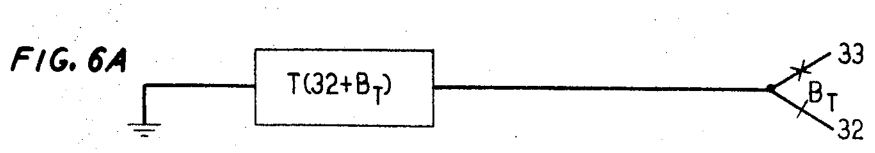
FIGS. 6A through 6R are diagrams of minor relay switching trees included in the translator.
Figure 6B:
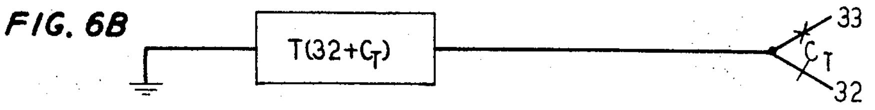
Figure 6C:
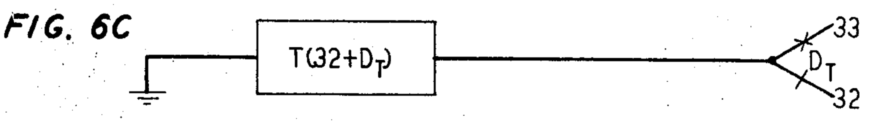
Figure 6D:
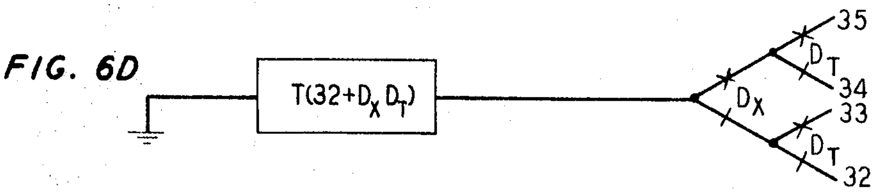
Figure 6E:
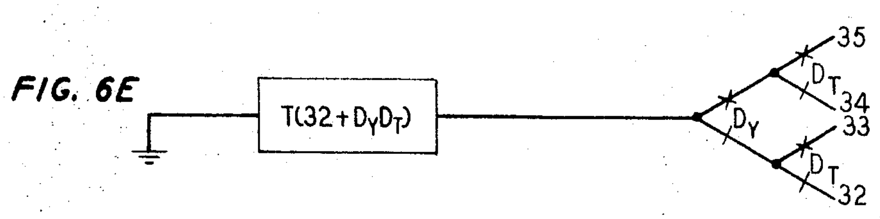
Figure 6F:
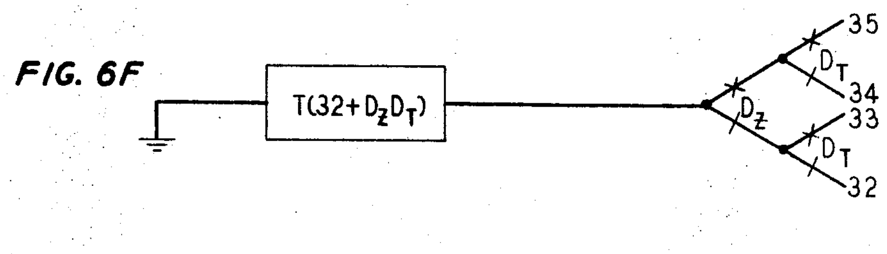
Figure 6G:
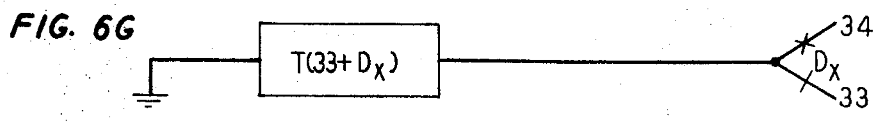
Figure 6H:
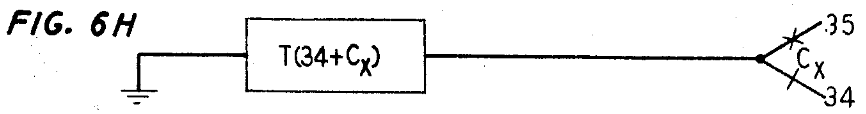
Figure 6I:
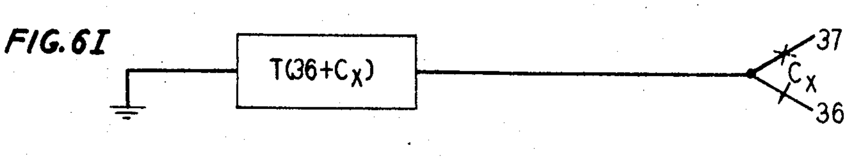
Figure 6J:
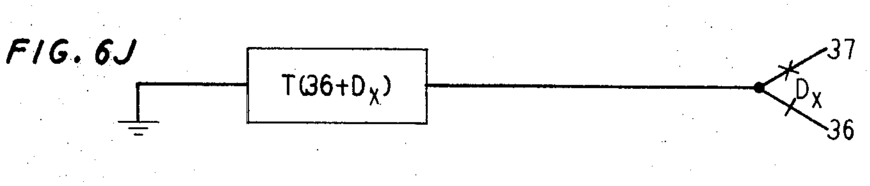
Figure 6K:
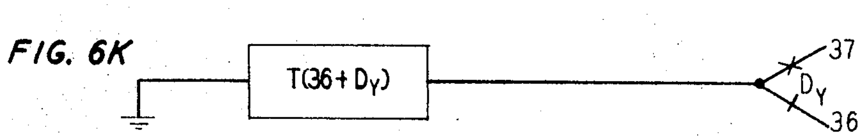
Figure 6L:
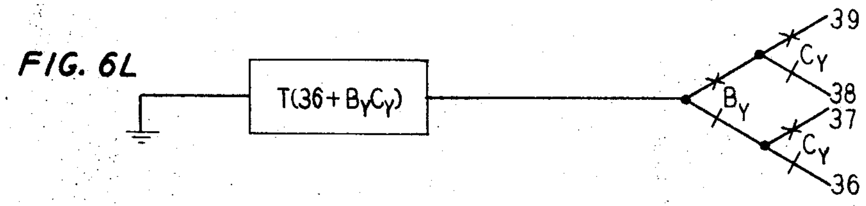
Figure 6M:
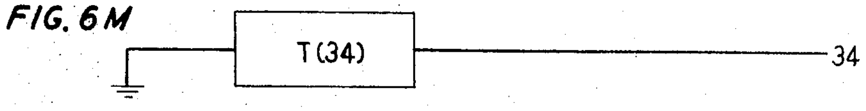
Figure 6N:
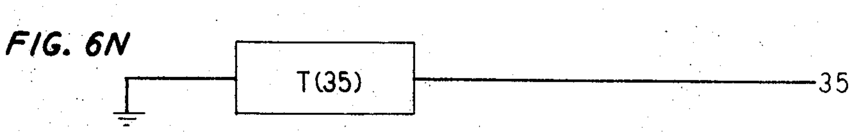
Figure 6P:
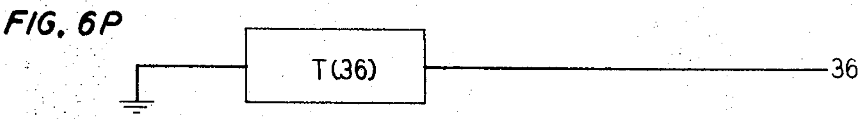
Figure 6Q:
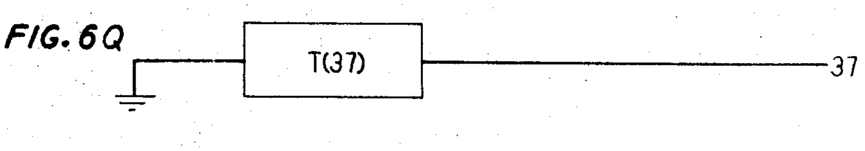
Figure 6R:
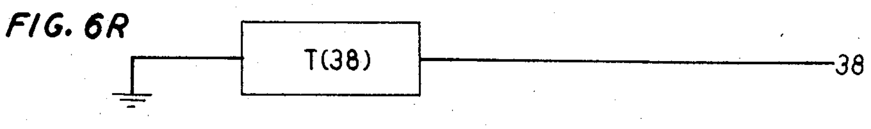

In FIGS. 6A through 6R, there are shown 17 minor switching trees, which are the trees 76 shown as a single block in FIG. 1 and which are used to selectively enable seven additional tones 32 through 38 alternatively with the 32 tones 0 through 31 controlled by the major switching trees. Each minor switching tree, shown in FIGS. 6A through 6R, is adapted to selectively couple ground through a unique path to one of the alternative tone relays. The particular tone relays with which the minor switching trees are associated are identified by the reference characters assigned to output terminals on the right-hand side of the FIGS. 6A through 6R. Whether a particular minor switching tree actually couples ground to a particular tone relay or not depends upon the state of an associated enabling circuit and the state of associated switching tree drive relays.

These minor switching trees and the major switching trees each have an enabling circuit interposed between ground and the contacts of the first cell of the particular tree. Each such enabling circuit is comprised of a predetermined combinational logic circuit. Each of these logic circuits is designated by a Boolean transmission function T( ) that is identified by inserting within the brackets a tree designator for major switching trees or the lowest tone number affected plus any drive relays in the associated tree for the minor trees. For instance, the enabling circuit for the major switching tree X has a transmission function T(X), and the enabling circuit for the minor switching tree of FIG. 6A has a transmission function $T(32+B_T)$. The transmission functions of all trees are adapted so that for any combination of input signals there are three and only three switching trees enabled to couple ground to tone relays. Therefore three and only three tone relays are activated in response to each combination of input signals to the translator.

A method to determine the transmission functions for the various switching tree circuits is developed from flow charts to be described. The flow charts are conventional charts that are used in preparation of computer programs but are used herein as a convenient design aid in developing and describing the translator of the illustrative embodiment.

The flow charts include four kinds of boxes. Each flow chart has an initial condition box at the top. In addition there are some decision boxes which determine whether the last four elements of a particular intermediate code word, such as the intermediate code word X, are greater than, less than, or equal to the last four elements of another intermediate code word, such as the words Y and Z. The decisions made by the decision boxes are determined by the operation of the comparison circuit 70 of FIG. 4. A third kind of box shows which switching tree drive relays are to be complemented. A fourth kind of box shows which three switching trees are enabled to select output tones.

It has been found that all possible combinations of 39 tones taken three at a time can be determined basically by considering the state of auxiliary relays $A_T$, $A_{X1}$, $A_{Y1}$, and $A_{Z1}$ together with the state of the relays of the comparison circuit 70. Thus the initial condition box of each different flow chart includes a different state of the relays $A_T$, $A_{X1}$, $A_{Y1}$, and $A_{Z1}$. A few unique combinations of output tones require further consideration of the state of selected switching tree relays.

Figure 7:
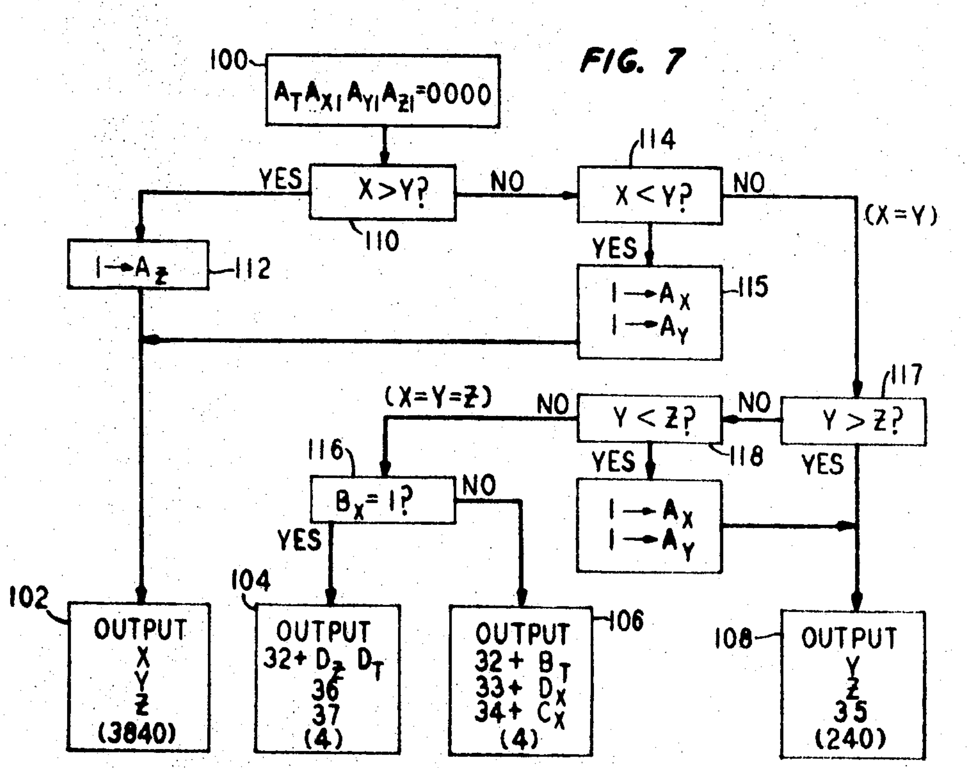
FIG. 7, which is shown on the sheet with FIG. 2, is a flow chart used for determining which switching tree relays are selectively complemented and which switching trees are activated in response to particular control circuit states.

FIG. 7 which is drawn on the sheet with FIG. 2, is a conventional flow chart that determines portions of the transmission functions required for complementing selected drive relays and for enabling selected switching trees in the illustrative embodiment of the invention. Significant features of this flow chart include the fact that the chart is only applicable when the initial conversion of the two-out-of-five code words to the binary-coded-decimal code words yields "0" states for all of the relays $A_T$, $A_{X1}$, $A_{Y1}$, and $A_{Z1}$. Therefore the initial condition for the flow chart of FIG. 7 is $A_T$, $A_{X1}$, $A_{Y1}$, $A_{Z1}$=0000, as shown in the box 100. Each branch of the flow chart from the initial condition box 100 to any one of the four output boxes 102, 104, 106, and 108 yields a unique combination of activated switching trees and output tones for each unique combination of input signals to the translator. As described further hereinafter, this flow chart can be readily analyzed in conjunction with a truth table organized to display the transmission functions both for enabling the switching trees and for complementing selected drive relays.

Referring now to FIG. 8, there is shown a truth table which is adapted to represent the transmission functions for all of the switching tree enabling circuits and the series and shunt control circuits which evolve from the flow chart of FIG. 7. Note should be made that the flow chart of FIG. 7 and the truth table of FIG. 8 define switching tree enabling circuits and series and shunt control circuits for the combinations of states which occur in various auxiliary circuits of the translator as a result of the initial conversion into intermediate code words, in the comparison of the magnitude of those intermediate code words, and in the selected switching tree relays, as previously described. The truth table may be extended readily to the right and to the bottom in a well-known method considering the state of the relays $A_T$, $A_{X1}$, $A_{Y1}$, and $A_{Z1}$ together with the state of the comparison circuit 70 and the relays $B_X$ and $C_X$ to further represent additional portions of the transmission functions for all of the enabling circuits and the series and shunt control circuits determined by the flow charts of FIGS. 10 through 14. For clarity of this disclosure, only a portion of the entire truth table is shown in FIG. 8. This portion covers all combinations of intermediate states in the translator of FIG. 1, covered by the flow chart of FIG. 7.

In FIG. 8 the truth table is divided conventionally under captions INPUTS and OUTPUTS and includes an additional portion under the caption COMPLEMENT TO. Under the caption INPUTS, each column represents the state of a relay designated at the top of the column. Under the caption OUTPUTS each column represents a state to which the switching tree enabling circuit, designated at the top of the column, is set. The caption COMPLEMENT TO has columns which indicate that the switching tree drive relay, designated at the top of each column, is complemented to the state shown. A dash (–) in various positions under the caption INPUTS indicates a "don't care" state. A star (*) in various positions under the caption COMPLEMENT TO indicates that a relay at the top of the column is in a state that is uneffected by combinations of states existing in the translator.

In the portion of the truth table under the caption INPUTS, there are several significant features. As previously mentioned each column is headed by the designation of a relay. The four leftmost columns are headed by the designators for the four auxiliary relays $A_T$, $A_{X1}$, $A_{Y1}$, and $A_{Z1}$. The next six columns are "1," the designators for the relays indicates the comparison circuit, shown in FIG. 4. The two rightmost columns under the caption INPUTS are headed by the designators for two switching tree drive relays $B_X$ and $C_X$. It has been determined that consideration of the states of the relays $B_X$ and $C_X$ plus the state of the relays $A_T$, $A_{X1}$, $A_{Y1}$, and $A_{Z1}$ and the state of the comparison circuit 70 can provide all combinations of 39 tones taken three at a time. Although relays other than $B_X$ and $C_X$ might be used for the same purpose, the relays $B_X$ and $C_X$ are to be used for the purposes of this illustrative embodiment. In this portion of the truth table under the caption INPUTS, a "0" indicates that the relay designated at the head of the column is not operated, nor energized, at the time during each translation sequence when both the conversion to the five-element intermediate code word and the comparison of magnitudes of the intermediate code words are completed. A "b 1," on the other hand, indicates that the relay designated at the head of the column is operated at the just mentioned time during the translation sequence.

In view of the just mentioned definitions and the fact that each dash (–) indicates a "don't care" condition, each row under the caption INPUTS represents a unique state of the designated relays at the time during each translation sequence when both the conversion to the five-element intermediate code words and the comparison of the magnitudes of the intermediate code words are completed. For instance, as represented in the top row of FIG. 8, the relays $A_T$, $A_{X1}$, $A_{Y1}$, $A_{Z1}$, $E_{XY}$, and $G_{XY}$ are in a state determined by reference to the flow chart of FIG. 7. In accordance with the initial box 100 therein, the relays $A_T$, $A_{X1}$, $A_{Y1}$, and $A_{Z1}$ are each in their "0," or unenergized, state. As previously stated, these relays $A_T$, $A_{X1}$, $A_{Y1}$, and $A_{Z1}$ are set to a state determined by the conversion of the two-out-of-five code words into the five-element intermediate code words. Although the states of the relays $A_{X1}$, $A_{Y1}$, and $A_{Z1}$ originally are set the same as the respective states of the relays $A_X$, $A_Y$, and $A_Z$, the relays $A_{X1}$, $A_{Y1}$, and $A_{Z1}$ retain their original states even though one or more of the relays $A_X$, $A_Y$, and $A_Z$ subsequently may be complemented. In accordance with the decision box 110 in FIG. 1, a YES answer indicates that the magnitude of the last four elements of the intermediate code word X is greater than the magnitude of the last four elements of the intermediate code word Y and directs progression along the leftmost path of FIG. 7. The decision YES further indicates that the intermediate code word X is greater than the intermediate code word Y and determines, by way of the bottom row of FIG. 5A, that relay $E_{XY}$ of FIG. 4 is in its "0," or unenergized, state and that relay $G_{XY}$ therein is in its "1," or energized, state.

This combination of conditions during the translation sequence causes the translator circuits to respond in accordance with the functions shown along the leftmost path of FIG. 7. As shown in that leftmost path, the shunt control circuit $T_Z(A_Z)$ in FIG. 2 responds in accordance with a function box 112 of FIG. 7, and the enabling circuits T(X), T(Y), and T(Z) associated with the major switching trees X, Y, and Z in FIG. 1 are enabled, as shown in the output box 102 of FIG. 7. All other switching trees are disabled.

If the decision of the decision box 110 is NO, then proceed along the flow chart of FIG. 7 to a decision box 114 which decides whether the binary value of the last four elements of the intermediate code word X is less than the binary value of the last four elements of the intermediate code word Y. If the code word X is less than the code word Y, the decision is YES and the state of relays $E_{XY}$ and $G_{XY}$ is determined by the middle row of FIG. 5A. According to a function box 115, the switching tree drive relays $A_X$ and $A_Y$ are complemented by setting them to their state "1." The relay switching trees X, Y, and Z are enabled by the enabling circuits T(X), T(Y), and T(Z), as shown in the output box 102. All other switching trees are disabled.

The portion of transmission functions for the switching tree control circuits, as derived from the flow chart path through the decision boxes 110 and 114 and the function box 115 to the output box 102, is shown across the second row of the truth table of FIG. 8.

In a similar manner, each path through the flow chart of FIG. 7 determines a separate row of the truth table of FIG. 8. Complete analysis of the flow chart of FIG. 7 yields the portion of the truth table shown in FIG. 8. Thus there are six branches through the flow chart and each of such branches yields a different row of the truth table in FIG. 8.

Referring once again to FIG. 8, several additional features are shown under the caption OUTPUTS. As previously mentioned, each column is headed by the designation of a switching tree. The three leftmost columns are headed by the designations for the three major switching trees X, Y, and Z, and the remaining columns are headed by the designations for the minor switching trees. In this portion of the truth table, a "1" indicates the switching tree designated at the top of the column is enabled in response to the state of the relays shown in the same row under the caption INPUTS. In each row under the caption OUTPUTS, there are three and only three switching trees enabled in response to any state of the relays under the caption INPUTS. The three switching trees which are enabled are determined by reference to the output boxes 102, 104, 106, and 108 in FIG. 7. A "0" in any position under the caption OUTPUT in FIG. 8 indicates that the switching tree designated at the top of the column remains disabled in response to the state of the relays shown in the same row under the caption inputs. Each row under the caption OUTPUTS represents one of the paths through the flow chart of FIG. 7 to the output boxes 102, 104, 106, and 108. The switching tree designators in those output boxes represent the trees enabled as a result of input conditions presented by the flow chart through the various paths leading to the particular output box to be analyzed. Since there is one truth table row for each path through the flow chart of FIG. 7 and since there are six of such paths shown in FIG. 7, six separate rows are shown in FIG. 8.

Transmission functions for the enabling circuits of the various switching trees can be readily derived from the information included under the captions INPUTS and OUTPUTS. For instance, a transmission function in the sum of products, or the standard sum form, for the enabling circuit T(X), shown in FIG. 1, is obtained by satisfying the "1" values in the column X of FIG. 8. The "1" values in the column X occur only in the first and second rows. The products form of Boolean expression is written first for the INPUTS state of the first row and secondly for the INPUTS state of the second row. These two expressions are then written in a standard sum of products form.

$$T(X)=\bar{A}_T\bar{A}_{X1}\bar{A}_{Y1}\bar{A}_{Z1}\bar{E}_{XY}G_{XY}+\bar{A}_T\bar{A}_{X1}\bar{A}_{Y1}\bar{A}_{Z1}\bar{E}_{XY}\bar{G}_{XY}$$

Similarly a standard sum of products can be written for the enabling circuit T(Y), shown in FIG. 1. This is obtained by satisfying the "1" values in the column Y of FIG. 8.

$$T(Y)=\bar{A}_T\bar{A}_{X1}\bar{A}_{Y1}\bar{A}_{Z1}\bar{E}_{XY}G_{XY}+\bar{A}_T\bar{A}_{X1}\bar{A}_{Y1}\bar{A}_{Z1}\bar{E}_{XY}\bar{G}_{XY}$$

$$+\bar{A}_T\bar{A}_{X1}\bar{A}_{Y1}\bar{A}_{Z1}E_{XY}\bar{G}_{XY}\bar{E}_{YZ}\bar{G}_{YZ}+\bar{A}_T\bar{A}_{X1}\bar{A}_{Y1}\bar{A}_{Z1}E_{XY}\bar{G}_{XY}\bar{E}_{YZ}\bar{G}_{YZ}$$

These Boolean expressions represent switching circuits enclosed within the enabling circuits T(X) and T(Y), shown in FIG. 1. Additional enabling circuits for other switching trees, such as the enabling circuit T(Z) in FIG. 1 or the enabling circuit $T(32+B_T)$ of FIG. 6A, can be obtained in the same manner from the truth table of FIG. 8. For example, the transmission function for the enabling circuit $T(32+B_T)$ is determined by satisfying the "1" values in column $32+B_T$ of FIG. 8.

$$T(32+B_T)=\bar{A}_T\bar{A}_{X1}\bar{A}_{Y1}\bar{A}_{Z1}E_{XY}\bar{G}_{XY}E_{YZ}\bar{G}_{YZ}\bar{B}_X$$

Figure 9:
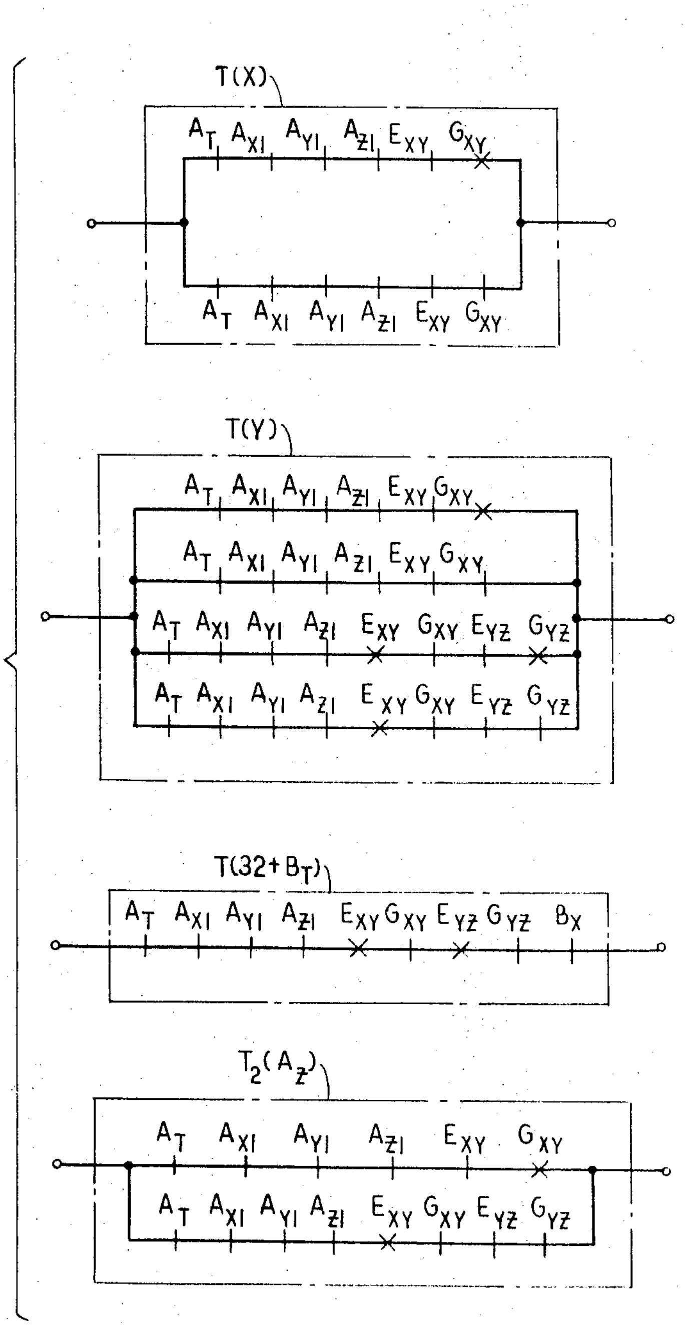
FIG. 9 is a group of schematic diagrams showing particular switching circuits for enabling certain switching trees and for complementing a particular switching tree drive relay.

In FIG. 9 there are shown schematics of switching circuits for the enabling circuits T(X), T(Y), and $T(32+B_T)$, as derived from the transmission functions T(X), T(Y), and $T(32+B_T)$ which were just developed. These switching circuits are determined by inserting a separate series branch of relay contacts for each standard sum of products in the pertinent transmission function. Primed terms become normally closed contacts, and unprimed terms become normally open contacts. A horizontal bar over the designation of a relay indicates a primed term, and an unprimed term has no such horizontal bar.

Under the caption COMPLEMENT TO in FIG. 8, there are shown the designations of certain switching tree drive relays which are selectively complemented in response to the combinations of states shown under the caption INPUTS. The relay or relays to be complemented in response to the various combinations shown in FIG. 8 are determined by the flow chart of FIG. 7. As previously mentioned, the leftmost path in the flow chart of FIG. 7 indicates that the switching tree drive relay $A_Z$ should be complemented from its "0," or unenergized, state to its "1," or energized, state at the same time that the enabling circuits T(X), T(Y), and T(Z) are enabled. The top row under the caption COMPLEMENT TO shows that the switching tree relay $A_Z$ should be complemented to its state "1" in accordance with the function box 112, shown in FIG. 7. Each star (*) under the caption COMPLEMENT TO indicates that other switching tree relays, such as the relays $A_X$ and $A_Y$ in the top row, are uneffected by the particular combination shown in the same row under the caption INPUTS.

The implementation of the enabling circuit $T_2(A_Z)$, shown in FIG. 2, is determined in a manner that is similar to the manner in which circuits T(X), T(Y), and $T(32+B_T)$ were determined for FIG. 9. The transmission function $T_2(A_Z)$ is determined by satisfying the "1" values in the column $A_2$ of FIG. 8.

$$T_2(A_Z)=\bar{A}_T\bar{A}_{X1}\bar{A}_{Y1}\bar{A}_{Z1}\bar{E}_{XY}G_{XY}+\bar{A}_T\bar{A}_{X1}\bar{A}_{Y1}\bar{A}_{Z1}E_{XY}\bar{G}_{XY}\bar{E}_{YZ}\bar{G}_{YZ}$$

In FIG. 9 there also is shown the switching circuit for the enabling circuit $T_2(A_Z)$, as derived from the transmission function $T_2(A_Z)$.

Another feature of FIG. 7 is a decision box 116 which includes a question "Does the state of relay $B_X=1$?", i.e., "Is the switching tree relay $B_X$ operated?" If the decision is YES, the minor switching trees $32+D_ZD_T$, 36, and 37 are enabled respectively by the enabling circuits $T(32+D_ZD_T)$, T(36), and T(37) of FIGS. 6F, 6P, and 6Q to control the output tone relays. If the decision is NO, the minor switching trees $32+B_T$, $33+D_X$, and $34+C_X$ are enabled respectively by the enabling circuits $T(32+B_T)$, $T(33+D_X)$, and $T(34+C_X)$ of FIGS. 6A, 6G, and 6H to control the output tone relays. The truth table entries representing the two flow chart paths from the initial box 100 of FIG. 7 through the decision boxes 110, 114, 117, 118, and 116 to the output boxes 104 and 106 are shown respectively in the fifth and sixth rows of FIG. 8. The third and fourth rows of FIG. 8 are determined, respectively, from two additional flow chart paths from the initial box 100 through the decision boxes 110, 114, and 117 and through the decision boxes 110, 114, 117, and 118 to the output box 108.

In parenthesis at the bottom of each of the OUTPUT boxes 102, 104, 106, and 108 in FIG. 7, there is a number which indicates the number of unique combinations of three-out-of-39 tones that are achieved through the relevant branches of the flow chart to each particular OUTPUT box. For instance, the branch through decision box 110 and the function box 112 to the output box 102 together with the branch through the decision boxes 110 and 114 and the function box 115 to the output box 102 yield 3840 unique combinations of three output tones out of 39 available. The 3840 unique combination result because according to the flow chart of FIG. 7, the switching trees X, Y, and Z are enabled and each of such trees has five, or Q, cells which are set to operate a different one of 32 available tone relays, as shown in FIG. 1.

FIGS. 10 through 14 are additional flow charts which facilitate completion of the truth table of FIG. 8 for various states of the relays $A_T$, $A_{X1}$, $A_{Y1}$, and $A_{Z1}$, as shown in the initial box of each flow chart, however, the sample of the truth table is considered to be representative of the method used to complete the truth table. Analysis of all additional paths of the flow charts shown in FIGS. 10 through 14 has been omitted in the interest of clarity of the disclosure of the illustrative embodiment.

As previously mentioned in relation to FIG. 2, the converter U includes series and shunt control circuits for complementing associated switching tree drive relays in response to predetermined combinations of the five-element intermediate code words in the translator. These switching tree drive relays are complemented during the fifth step of the translation operation. The shunt control circuit $T_2(A_Z)$ and the series control circuit $T_1(A_Z)$ are logic circuits used for complementing the state of the switching tree drive relay $A_Z$ in response to predetermined combinations of the five-element code words occurring in the translator of FIG. 1. In FIG. 2 the shunt control circuits $T(B_Z)$ and $T(C_Z)$, respectively, are adapted to selectively complement the state of relays $B_Z$ and $C_Z$ in response to predetermined combinations of input signals applied to the translator. These shunt control circuits $T_2(A_Z)$, $T(B_Z)$, and $T(C_Z)$ and the series control circuit $T_1(A_Z)$ derive their names from the fact that they are respectively in shunt with and in series with the switch contact circuits used for initially operating the relays $A_Z$, $B_Z$, and $C_Z$.

There are other significant features of the flow charts which should be mentioned in regard to these shunt and series control circuits. A portion of the transmission functions for the enabling circuits $T(B_Z)$ and $T(C_Z)$, shown in FIG. 2, are derived from analysis of paths through the flow chart of FIG. 10. The paths through the function boxes 119 and 120 both yield terms for the transmission function for the circuit complementing the state of the relay $B_Z$ of FIG. 2 by setting the relay $B_Z$ to its "1" state. The paths through the function boxes 120, 122, 124, and 126 yield terms for the transmission function for the circuit which complements the state of the relay $C_Z$.

Figure 10:
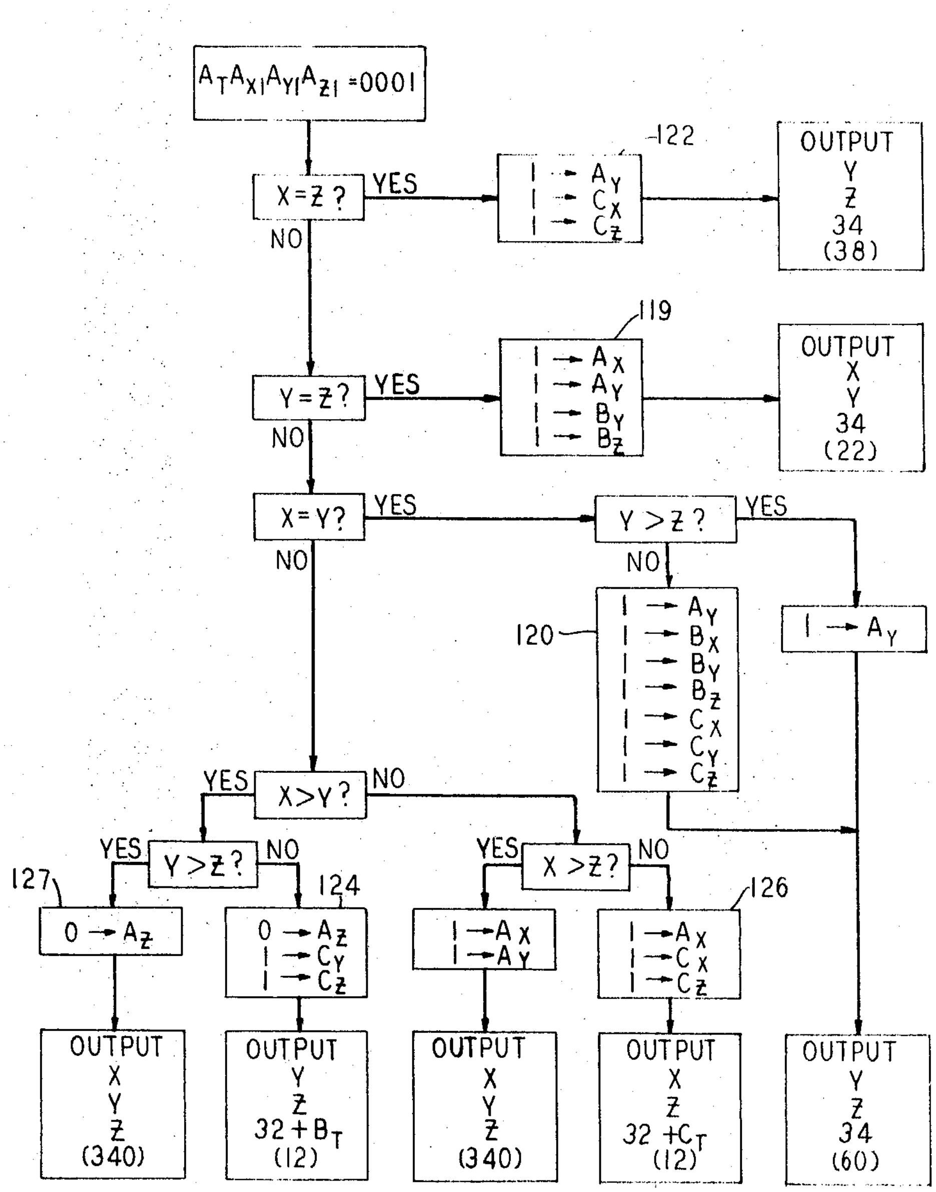
FIGS. 10 through 14 are additional flow charts used for determining which switching trees are enabled and which switching tree relays are complemented in response to additional control circuit states.
Figure 11:
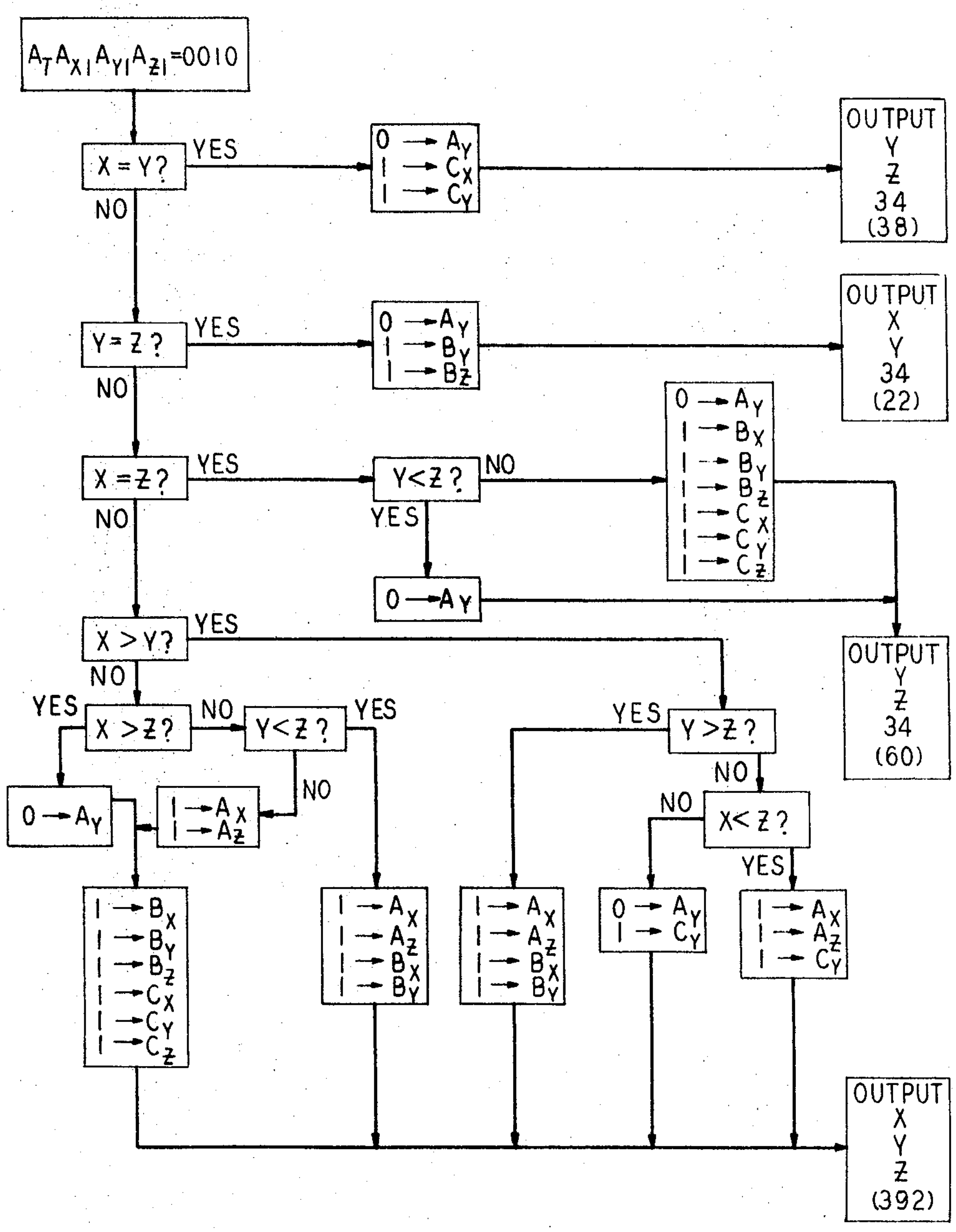
Figure 12:
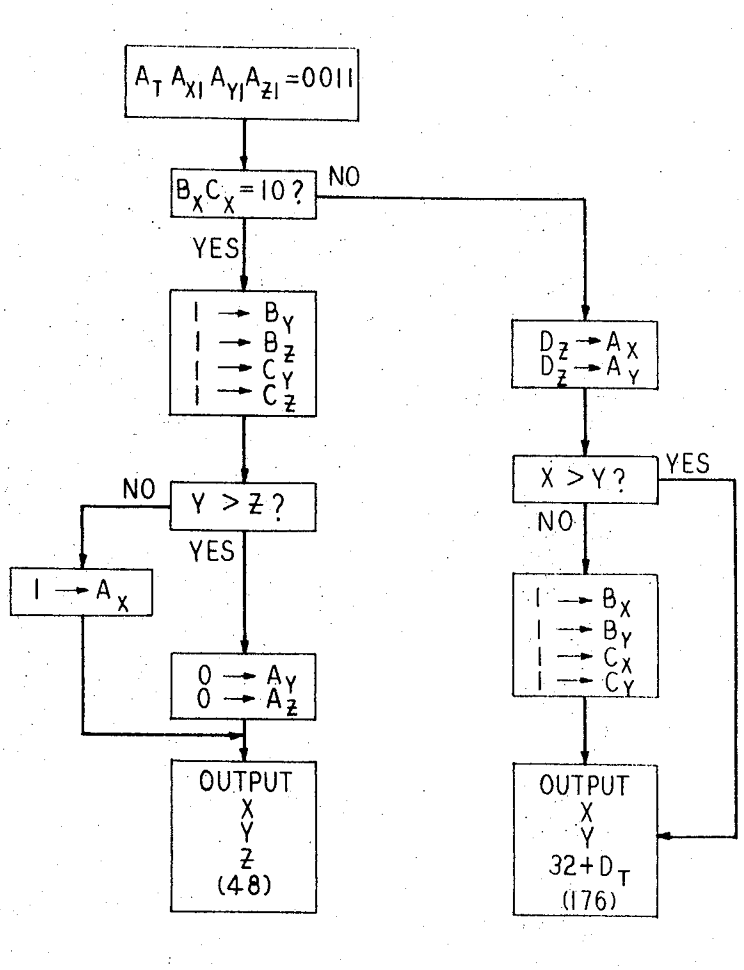

A portion of the transmission function for the series control circuit $T_1(A_Z)$ of FIG. 2, which selectively complements the relay $A_Z$, also is derived from a path through the flow chart shown in FIG. 10. The path through the function box 124 yields one term of the transmission function which specifies the logic circuit required in the series control circuit $T_1(A_Z)$ that disables the relay $A_Z$ after it has been initially operated. A function box 127 yields another term of the transmission function $T_1(A_Z)$. From the function boxes 124 and 127, one learns that a "0" should be entered in appropriate rows of FIG. 8 where each "0" is to be placed in the column $A_Z$. The transmission function $T_1(A_Z)$ is determined by satisfying the "0" values in the column $A_Z$ of FIG. 8.

The transmission function $T(A_Z)$ is determined by combining the functions $T_1(A_Z)$ and $T_2(A_Z)$ in series relationship.

$$T(A_Z)=T_1(A_Z)]\,[T_2(A_Z)]$$

Figure 13:
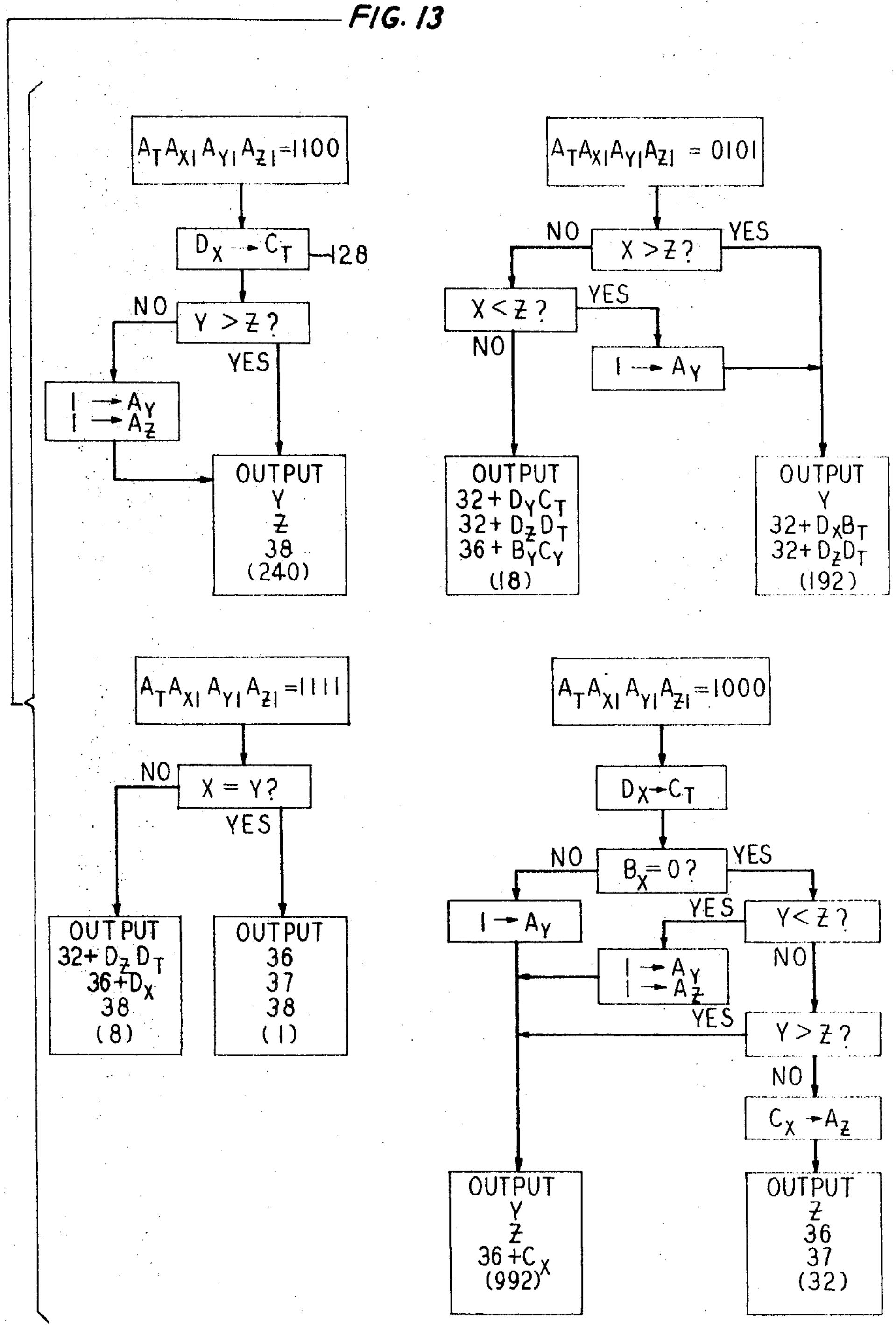
Figure 14:
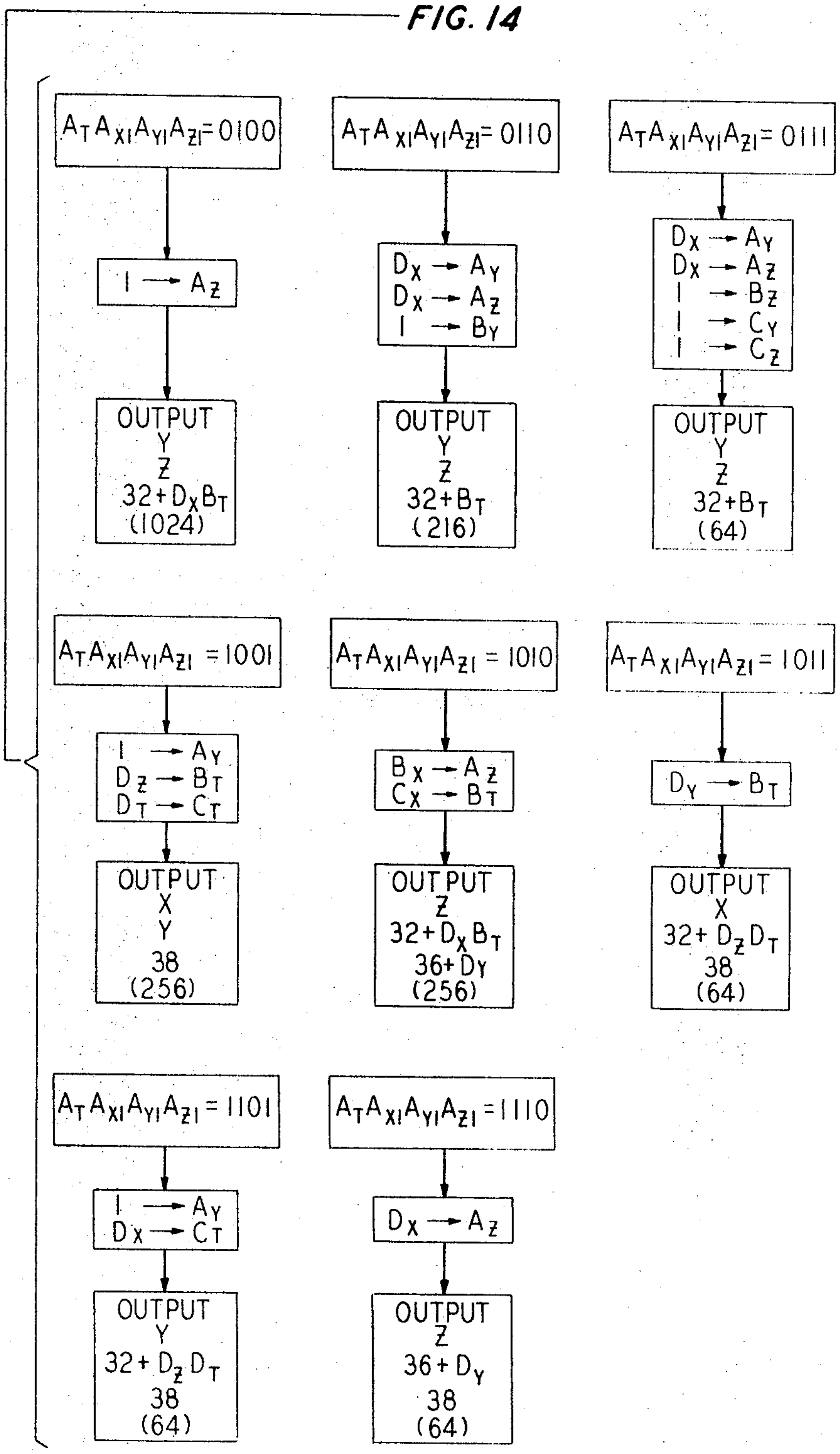

FIG. 13 includes a function box 128 which indicates that the state of the drive relay $D_X$ is set into the relay $C_T$ when the control relays $A_T$, $A_{X1}$, $A_{Y1}$, and $A_{Z1}$ are respectively in their 1100 state. The state of the drive relay $C_T$ is always unoperated before this complementing operation. Depending upon the state of the relay $D_X$, the relay $C_T$ either remains unoperated if the drive relay $D_X$ is unoperated or operates if the drive relay $D_X$ is operated. In the illustrative embodiment, all cases of selectively complementing a drive relay to agree with the state of another drive relay, such as in the case of relay $C_T$ just mentioned, the drive relay to be complemented is initially unoperated so that the resulting transmission function determines a shunt control circuit which can readily be included within the converters TH, H, T, and U, shown in FIG. 1 and described in detail with respect to the converter U in FIG. 2.

When the fifth step of the translation is completed, there are three switching trees enabled to control tone relays and the relays controlling the cells of these three trees have been complemented in accordance with the transmission functions represented by the flow charts. At the end of the fifth step, the translator is ready to activate three tone relays out of the 39 available tone relays for modulating a carrier signal produced by a transmitter which is not shown. The tone relays are held in their unoperated state until the end of the fifth step of translation by a timing control circuit, also not shown, but which withholds power from the solenoids of the tone relays until the fifth step of translation has been completed. Then as a sixth step in the translation, power is applied to the solenoids of the tone relays and three tone relays are energized through the control paths of the enabled switching trees.

The flow charts of FIGS. 7 and 10 through 14, together with the switching tree enabling circuits and the complementing control circuits represented thereby, are sufficiently extensive that they translate the input code words into groups of output tones representing all combinations of 39 different signals taken three at a time.

The above detailed description is illustrative of one embodiment of the invention, and it is to be understood that additional embodiments thereof will be obvious to those skilled in the art. The embodiment described herein together with those additional embodiments are considered to be within the scope of the invention.

I claim:

1. A translator comprising:
means for receiving input code words in a two-out-of-five code;
means coupled to the receiving means for translating the input code words into groups of signals representing all combinations of N different signals taken three at a time, wherein N is greater than three;

the receiving means is arranged for simultaneously receiving a plurality of input code words, and further comprises:
means concurrently converting the plurality of input code words to a plurality of intermediate code words in a different code, and
means responsive to the intermediate code words for selectively activating three-out-of-N output signals;
means comparing binary number magnitudes of the intermediate code words; and
means included within the converting means and responsive to the output of the comparing means for selectively changing the intermediate code words.

2. A translator comprising:
a control circuit having at least two states;
a plurality of K code converters, each having L outputs;
a plurality of M major switching trees each including Q cells having first and second states, wherein K times L is greater than M times Q;
means separately connecting M times Q outputs of the code converters individually to separate cells of the major switching trees;
means coupling at least one additional output from a code converter to the control circuit for controlling its state;
and means included within the code converters for complementing the state of at least one predetermined cell of the major switching trees selectively in response to the state of the control circuit.

3. A translator in accordance with claim 2 further comprising:
$2^Q$ signal circuits;
means coupling each of $2^Q$ separate outputs of each major switching tree to a different one of the signal circuits;
and the control circuit arranged to activate M different signal circuits in response to code word signals applied to the code converters.

4. A translator in accordance with claim 2 further comprising:
a plurality of R minor switching trees;
a plurality of enabling circuits each coupling a source of reference potential to an input of each separate switching tree; and
the plurality of such enabling circuits arranged to enable a total of M of the major and minor switching trees concurrently.

5. The method of translating data from a two-out-of-five code to an M-out-of-N code comprising the steps of:
applying input code words to converters;
converting input code words in the two-out-of-five code into binary-coded-decimal code words and rearranging the binary-coded-decimal code words to M intermediate code words;
energizing cells of separate switching trees;
energizing auxiliary control circuits in response to the intermediate code words for comparing binary number magnitudes of the intermediate code words;
simultaneously enabling M switching trees to control output signals and complementing selected cells of the switching trees in response to the comparative magnitudes of the intermediate code words as indicated by the state of the auxiliary control circuits;
and initiating M different output signals, wherein M is greater than two and N is greater than M.